United States Patent
Tolle et al.

(10) Patent No.: US 6,625,042 B2
(45) Date of Patent: Sep. 23, 2003

(54) POWER SUPPLY ARRANGEMENT COMPRISING A DC/DC CONVERTER WITH PRIMARY-SIDE CONTROL LOOP

(75) Inventors: Tobias Georg Tolle, Aachen (DE); Hendrikus Johannes Jacobus Domensino, Eindhoven (NL); Hendrik Jan Boswinkel, Eindhoven (NL); Arjan Van Den Berg, Nijmegen (NL); Hendrikus Johannes Janssen, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/114,504

(22) Filed: Apr. 2, 2002

(65) Prior Publication Data

US 2002/0172057 A1 Nov. 21, 2002

(30) Foreign Application Priority Data

Apr. 6, 2001 (DE) .......................... 101 17 301

(51) Int. Cl.$^7$ .............................................. H02M 3/335
(52) U.S. Cl. ........................................ 363/17; 363/98
(58) Field of Search ........................... 363/17, 98, 132, 363/16, 21.04, 21.12

(56) References Cited

U.S. PATENT DOCUMENTS

| | | | | |
|---|---|---|---|---|
| 5,612,860 A | * | 3/1997 | Meszlenyi | 363/49 |
| 5,808,879 A | | 9/1998 | Liu et al. | 363/17 |
| 5,940,280 A | * | 8/1999 | Murai et al. | 363/17 |
| 6,043,993 A | * | 3/2000 | Kobori et al. | 363/17 |
| 6,483,721 B2 | * | 11/2002 | Terashi | 363/17 |
| 6,496,387 B2 | * | 12/2002 | Halberstadt | 363/17 |

OTHER PUBLICATIONS

Phua Chee Heng, Ramesh Oruganti, "Family of Two–Switch Soft–Switched Asymmetrical PWM DC/DC Converters", PESC 1994.

* cited by examiner

*Primary Examiner*—Michael Sherry
*Assistant Examiner*—Gary L. Laxton

(57) ABSTRACT

A power supply arrangement having a DC/DC converter is presented that includes a control loop on the primary side of the isolation transformer within the DC/DC converter to control the voltage on the primary winding. The energy transfer across the isolation transformer is effected via control switches that alternately charge and discharge a capacitor through the primary winding. The control loop preferably adjusts the duty cycle of these control switches to control the voltage on the primary winding.

6 Claims, 2 Drawing Sheets

Figure 1:
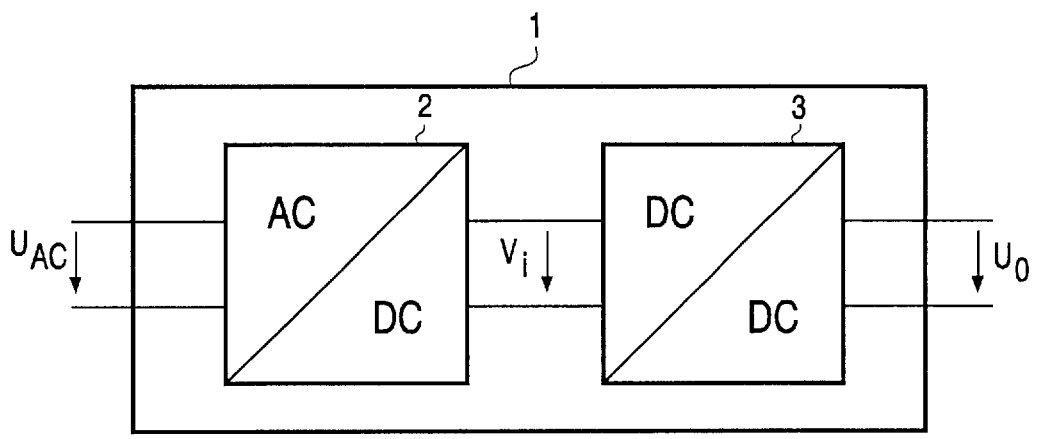

POWER SUPPLY ARRANGEMENT COMPRISING A DC/DC CONVERTER WITH PRIMARY-SIDE CONTROL LOOP

The invention relates to a power supply arrangement comprising a DC/DC converter. Such a power supply arrangement can be used in power supplies or (switched-mode) power supplies or charging devices (for example for mobile radios), in which an AC mains voltage is converted by an AC/DC converter and by the DC/DC converter into a DC supply voltage.

Converters with asymmetric half-bridge topologies are basically known. Known converters have zero voltage switching of the half-bridge switch elements. The switch elements are controlled by pulse width modulated control signals with a constant frequency. An optimal resetting of the transformer core is guaranteed. The leakage inductance of the transformer is used. The power load of the switch elements is reduced compared to the otherwise often used blocking converters (flyback converters). The EMI load (Electro Magnetic Interference) by asymmetric half-bridge converters is small.

A DC/DC converter arranged as an asymmetric half-bridge converter is known from U.S. Pat. No. 5,808,879 (FIG. 9), comprising a half bridge which includes a first and a second switch element (switch elements arranged as MOSFET-transistors) to which a DC voltage is applied i.e. the half bridge is arranged between a first DC voltage potential ("+" supply potential) and a second DC voltage potential ("−" reference potential, customarily equal to the ground potential). A circuit branch which comprises the primary winding of a transformer and a capacitor connected in series to the primary winding is connected in parallel to the first switch element which is connected to the first DC voltage potential. The capacitor is arranged between the connection point of the two switch elements and the primary winding. The primary winding of the transformer is arranged between the capacitor and the first DC voltage potential. A capacitive output filter is arranged in parallel to the output of the DC/DC converter. Between the capacitive output filter and the secondary winding of the transformer is arranged a diode. In case of energy transport from the primary side to the secondary side of the converter, a current will flow on the primary side, on the one hand, through the circuit branch connected in parallel to the switched-off (opened) first switch element, which circuit branch includes the primary winding and the capacitor and, on the other hand, also through the switched-on (closed) second switch element.

The converter described in U.S. Pat. No. 5,808,879 is advantageous in that over-current protection is only necessary for the second switch element. Over-currents which lead to the destruction of a switch element may occur during the switch-on phase of the converter and in case of overload. When the converter is switched on, the capacitor connected in series to the primary winding of the transformer does not yet have charge. Accordingly, the current flowing through the second switch element by which the capacitor is charged strongly increases in the phase shortly after it has been switched on. Accordingly, the second switch element is to be protected against over-currents in the switch-on phase of the converter. The switch element that is switched on and through which a current flows during the energy transfer from the primary side to the secondary side of the transformer is to be protected from over-currents in the case of overload. With the converter described here it is the second switch element.

The converter described in U.S. Pat. No. 5,808,879 furthermore has the advantage that the so-termed burst mode is automatically set by measuring the input power on the primary side of the transformer. The burst mode is used with a reduced power consumption for a standby operation of a load and is characterized in that the converter is alternately switched off and on for a brief period of time. The converter is switched off especially when the two switch elements are simultaneously switched off. While the converter is switched off, the no-load losses of the converter are minimal. When the converter is switched on, the output capacitor is charged until the output voltage has reached its set value. This sequence of switching on and off causes a low power consumption with an available output voltage. The burst mode is only sensible with a small load, because otherwise the output voltage sharply drops during pauses of operation. For automatically activating and deactivating the burst mode, the input or output power of the converter can be measured. Measuring the input power is more cost effective compared to measuring the output power, because the electric isolation of output side and input side by the transformer need not be bridged. The input power is preferably measured by measuring the input voltage and the input current. The measurement of the input current is possible here simply by measuring the current flowing through the second switch element while only a measuring resistor (shunt resistor) is connected in series to the second switch element, which is so simple here because the second switch element is the only current path to the DC voltage potential coupled to the second switch element. It is particularly simple to measure the current when the measuring resistor is connected to the respective reference potential (ground potential) i.e. the voltage on the measuring resistor can be measured relative to the reference potential.

From the conference contribution by Phua Chee Heng, Ramesh Oruganti, "Family of Two-Switch Soft-Switched Asymmetrical PWM DC/DC Converters", PESC 1994 is known a still older version of an asymmetrical half-bridge converter which is referred to as a buck reset TRC2-converter. This converter, however, does not have the two above-mentioned advantages of the converter of FIG. 9 of U.S. Pat. No. 5,808,879.

The converters described can be designed with or without a control of the output voltage. If a control is provided, the converter output voltage is customarily fed back via a feedback branch with an optocoupler, which leads to increased cost and is applied to a primary side control circuit which adapts the duty cycle of the control signals applied to the switch elements in dependence on the current converter output voltage, so that the output voltage is kept constant. Without a control of the output voltage, increased fluctuations of the converter output voltage especially in case of fluctuations of the input voltage and of the output current are to be taken into the bargain.

It would be advantageous to provide an asymmetrical half-bridge converter which has said advantages of the converter from U.S. Pat. No. 5,808,879, generates an output voltage with a smallest possible tolerance area, and is furthermore highly cost-effective.

Toward this end, a converter could be provided with a control loop on the primary-side of the transformer. Provided that a primary-side control loop is included, an optocoupler is not necessary for realizing a feedback path, so it could be eliminated to reduce cost. The primary-side control loop would be realized by circuit arrangement components located on the primary side.

In a primary-side control loop particularly the voltage which is impressed during the transmission of power from the primary side to the secondary side of the primary winding of the transformer is set to a predefinable fixed value, preferably by adapting the duty cycle of the control signals to be used for controlling the switch elements.

When operated in an uncontrolled manner the voltage on the primary winding and thus the output voltage of the DC/DC converter depending on it would fluctuate intolerably. Reasons for this are fluctuations of the input voltage, ripple of the input voltage and tolerances of the adjustable duty cycle based on production engineering tolerances of the control circuit which is particularly realized by an integrated circuit. To counteract fluctuations of the voltage on the primary winding or the converter output voltage, respectively, the primary-side control is used. The control signals to be adjusted for the primary-side control for controlling the switch elements are particularly pulse width modulated i.e. an adjustment of the control signals is made by adjustment of the respective duty cycle. Alternative embodiments of the invention could utilize an additional capacitor.

The power supply arrangement according to an embodiment of the invention can be arranged for obtaining a measuring value for the voltage on the primary winding when the DC/DC converter is switched on by the tapping of the potential between the primary winding and the capacitive element. Since the second switch element coupled to the second DC voltage potential is turned on during energy transfer, and the capacitive element is coupled to the first DC voltage potential, this potential between the capacitive element and the primary winding, irrespective of the instant in a switching cycle, represents the voltage on the primary winding of the transformer during energy transfer from the primary side to the secondary side, so that the converter output voltage is set with a sufficient tolerance for many applications (for example, charging devices for mobile telephones) in this manner. Basically, the arrangement also works with a primary-side control when there is an energy transfer from the primary side to the secondary side in the other state of the half bridge or when there is fill-wave rectifying in the two states of the half bridge.

Various embodiments of the power supply arrangement according to the invention are possible, including use of inductive output filters and/or full-wave rectifying. At least one circuit arrangement according to the invention disclosed herein is well-suited, for example, for use in a charging device for a mobile telephone.

These and other aspects of the invention are apparent from and will be elucidated with reference to the examples of embodiment described hereinafter.

Figure 2:
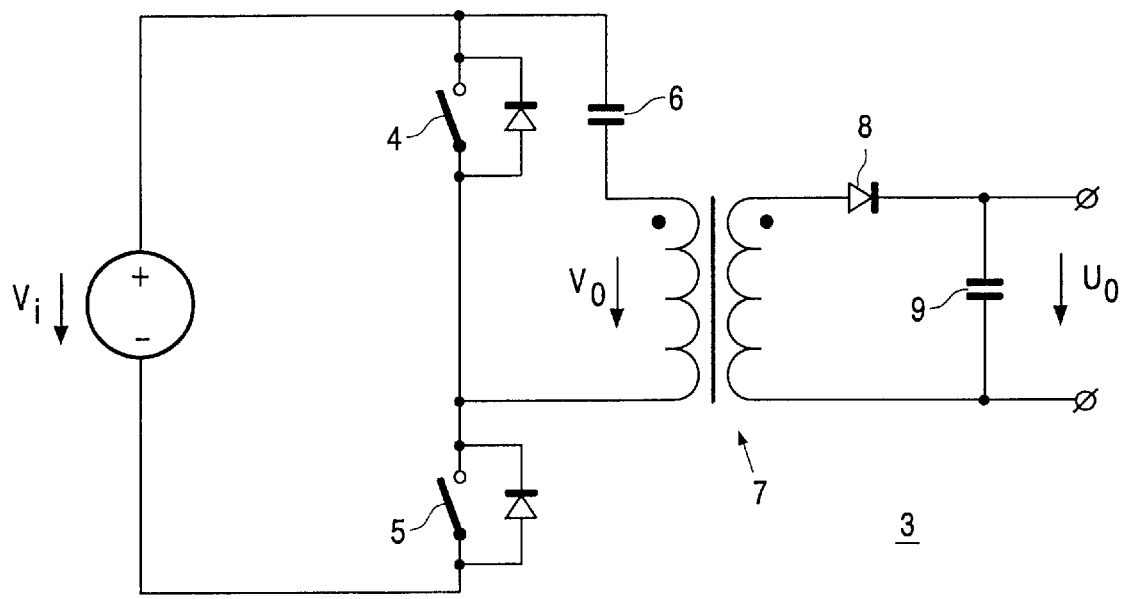
Figure 3:
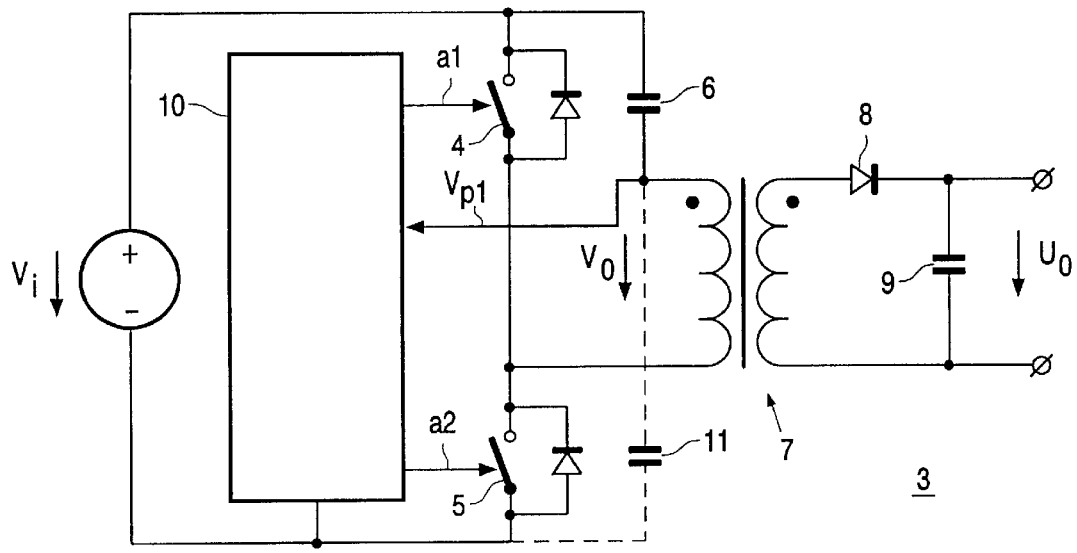
Figure 4:
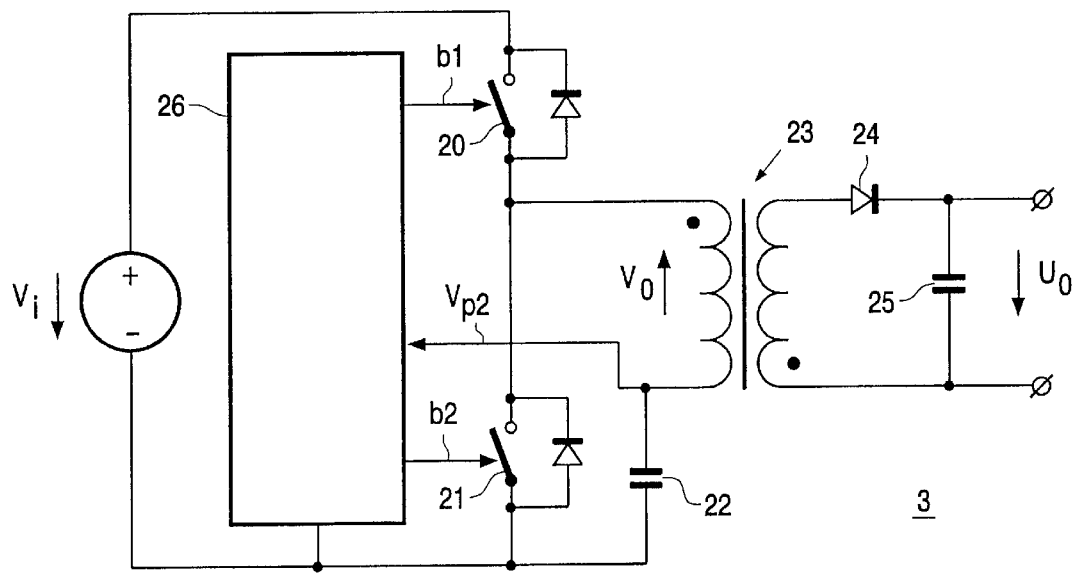

In the drawings:

FIG. 1 shows an electric device with a power supply arrangement according to the invention, FIG. 2 shows a DC/DC converter used in the power supply arrangement, FIG. 3 shows the converter of FIG. 2 with a primary-side control loop and FIG. 4 shows a variant of the converter shown in FIG. 3.

FIG. 1 shows electric device 1 with a power supply arrangement which comprises an AC-DC converter 2 and a DC/DC converter 3. The electric device 1 converts an AC mains voltage (for example 230 volts) $U_{AC}$ into a DC supply voltage $U_0$. First the AC mains voltage $U_{AC}$ is converted into a DC voltage $V_i$ by the AC/DC converter 2, which DC voltage $V_i$ is used as an input voltage for the DC/DC converter 3 and is converted by it into the DC supply voltage $U_0$. The electric device 1 is a (switched-mode) power supply or, preferably, a charging device for mobile telephones. AC/DC converters are known so that the converter 2 will not be further discussed. The invention rather relates to the realization of the DC/DC converter 3 which is explained in more detail by means of the FIGS. 2 to 4.

FIG. 2 shows a first variant of the DC/DC converter 3. The input of this converter is supplied with the DC voltage $V_i$ which is applied to the series combination of two switch elements 4 and 5. The positive supply potential (+) is then connected to a terminal of the switch element 4. The reference potential (−), i.e. the ground potential is connected to the switch element 5 whose other terminal is connected to the switch element 4. The circuit branch comprising a capacitive element 6 and a primary winding of a transformer 7 connected in series to the capacitive element 6, the direction of winding (orientation/polarity of the windings) of which transformer 7 is featured by dots, is connected in parallel to the switch element 4. A terminal of the secondary winding of the transformer 7 is connected to the anode of a diode 8. Between the cathode of the diode 8 and the other terminal of the secondary winding of the transformer 7 is arranged a capacitive output filter here in the form of a capacitor 9. The DC output voltage $U_0$ of the DC/DC converter 3 is tapped from the capacitive output filter 9.

The switch elements 4 and 5 are alternately switched on or off with a predefined duty cycle. When the switch element 4 is switched off and switch element is switched on, there is a transport of energy from the primary side of the converter 3 via the transformer 7 to the secondary side of the converter 3. The DC voltage $V_i$ then generates a current flowing through the circuit branch comprising the capacitive element 6 and the primary winding of the transformer 7 and also through the switch element 5. A voltage $V_0$ on the primary winding of the transformer 7 then drops as is shown. With the selected direction of the winding of the transformer 7 and the available polarity of the diode 8 a current is then caused to flow through the diode 8 on the secondary winding of the transformer 7. The winding direction of the primary and secondary windings of the transformer is selected so that there is a flow of energy from the primary side to the secondary side of the transformer 7 in essence when there is a current flowing through the second switch element 5. As the current flows through the diode 8, the capacitor 9 is charged and/or a current is caused to flow to a connected load.

If the switch element 4 is turned on and the switch element 5 is turned off, the polarity of the voltage $V_0$ on the primary winding of the transformer 7 is reversed and a current flows through the capacitive element 6, the switch element 4 and the primary winding of the transformer 7. In this operating state of the converter 3 the magnetization of the core of the transformer 7 is reduced (reset of the transformer core).

FIG. 3 shows the DC/DC converter as shown in FIG. 2 extended by a primary-side control loop. This control loop implies that a point between the capacitive element 6 and the primary winding of the transformer 7 is connected to an input of a control circuit 10, so that the potential $V_{p1}$ present at the respective point and representing the voltage $V_0$ on the primary winding of the transformer 7, is applied to the control circuit. The control circuit 10 generates in dependence on potential $V_{p1}$ a control signal a1 for controlling the switch element 4 and a control signal a2 for controlling the switch element 5. The duty cycle of the control signals a1 and a2 is set and adapted by the control circuit 10, so that the voltage $V_0$ on the primary winding of the transformer 7 drops when energy flows from the primary side to the secondary side of the converter 3, is controlled to a predefinable voltage value. This control provides that the output voltage $U_0$ which depends on the voltage $V_0$ is set. The primary-side control loop counteracts an undesired influence of fluctuations of the input voltage $V_i$, of a ripple (more particularly 100 Hz) and of inaccuracies during the setting of the duty cycle of the control signals a1 and a2 based on manufacturing tolerances for the control circuit 10 which is customarily realized by means of an integrated circuit, so that a usable DC output voltage $U_0$ is rendered available by means of the converter 3. In a preferred embodiment the control is only converted by setting the duty cycle of the control signals a1 and a2. Basically, however, an adaptation of the frequency of the control signals a1 and a2 to said purpose is also possible, which, however, increases the complexity of the primary-side control loop. In a variant of the circuit a point between the capacitor 6 and the primary winding of the transformer 7 is connected to the reference potential by means of a further capacitor 11 (connections to the capacitor 11 are shown in a dashed line).

FIG. 4 shows a variant of the DC/DC converter 3. The basic structure is highly similar to the structure of converter 3. A DC voltage $V_i$ is applied to two series-arranged switch elements 20 and 21, the supply potential (+) being connected to the switch element 20 and the reference potential (−) to the switch element 21. In the present case, however, the switch element 21 of the circuit branch, which switch element is connected to the reference potential, is connected in parallel to a series combination of the primary winding of a transformer 23 and a capacitive element 22. A diode 24 having its forward direction in the direction of the converter output is arranged between a capacitive output filter 25 realized by a capacitor 25 and the secondary winding of the transformer 23. The converter output voltage $U_0$ is tapped from the capacitor 25.

Contrary to FIG. 3, the primary winding and the secondary winding of the transformer 23 now have reversed polarities. Accordingly, there is an energy transfer from the primary side to the secondary side of the converter 3 when the switch element 20 is turned off and the switch element 21 is turned on. A current then flows through the primary winding of the transformer 23, through the switch element 21 and through the capacitive element 22. On the primary winding 23 a voltage $V_0$ drops in the direction shown in the drawing, so that a current flows through the diode 24 into the capacitor and/or into a load connected to the output of the converter 3. The energy then flowing from the primary side to the secondary side is supplied by the capacitive element 22. This element is charged when the switch element 20 is turned off and the switch element 21 is turned on, so that a current generated by the voltage $V_i$ flows through the switch element 20, the primary winding of the transformer 23 and the capacitive element 22, while there is no energy transfer from the primary side to the secondary side of the converter 3 through the primary winding of the transformer when the current flows in this direction.

Also the converter variant shown in FIG. 4 has a primary-side control loop. This implies that a potential $V_{p2}$ present between the primary winding of the transformer 23 and the capacitive element 22 is tapped and applied to the control circuit 26. This potential $V_{p2}$, which represents the voltage $V_0$ present on the primary winding of the transformer 23 when there is a flow of energy from the primary side to the secondary side of the converter 3, is controlled to a predefinable value by means of a setting of the duty cycle of the control signals b1 and b2 which are used for controlling the switch elements 20 and 21 respectively, and are generated by the control circuit 26 i.e. also the voltage $V_0$ is controlled at a predefinable value. Also with the variant shown in FIG. 4 an additional capacitor (not shown) may optionally be inserted, which additional capacitor then connects a point between the capacitor 22 and the primary winding of the transformer 23 to the supply potential.

The converter variants shown in FIGS. 2 to 4 are advantageous in that the voltage $V_0$ constantly to be controlled at a predefinable value, which voltage $V_0$ is present on the primary winding of the transformer 7 or transformer 23 respectively, during an energy transfer from the primary side to the secondary side of the converter, is represented by the potential $V_{p1}$ or $V_{p2}$ respectively, irrespective of the point of time in a switching cycle; these potentials may be used as a controlled variable. This is made possible because the capacitive element 6 is connected to the supply potential (+) or the reference potential (−) respectively, and, on the other hand, a terminal of the primary winding of the transformer 7 or of the transformer 23 respectively, is connected to the terminal between the switch elements 4 and 5 or 20 and 21. In the converter variants shown in FIGS. 2 and 3 only one of the switch elements of the respective half bridge, that is switch element 5, can be provided with an overflow protection which protects against overflows in the initial phase and protects when the converter 3 has an overload. The converter in FIG. 4 on the other hand needs an overflow protection element in the two switch elements 20 and 21 so that switch element 20 is protected against overflows in the initial phase and switch element 21 is protected against overload of the converter.

The converter variants shown in FIGS. 2 and 3 are furthermore advantageous in that the input power of the converter 3 can be measured by measuring the voltage $V_i$ and the current flowing through the switch element 4, so that a measuring resistor (shunt) (not shown) is arranged between the switch element 5 and the reference potential (ground potential), while the current can easily and reliably be measured by means of a measuring resistor connected to ground. Furthermore, the examples of embodiment in FIGS. 3 and 4 may basically also be modified so that another direction of winding of the transformer 7 is chosen.

What is claimed is:

1. A power supply arrangement comprising a DC/DC converter including:
   - a half bridge, including a first and a second switch element, which when the power supply arrangement is in operation is connected between a first and a second DC voltage potential;
   - a transformer having a primary side with a primary winding and a secondary side with a secondary winding, whose primary winding together with a first capacitive element is included in a circuit branch connected in parallel to the first switch element, the capacitive element in the circuit branch being connected in series to the primary winding; and
   - a primary-side control loop configured to control voltage on the primary winding of the transformer by adapting control signals for at least one of the first and second switch elements, configured to adapt a duty cycle associated with the first and second switch elements, and configured to adapt the control signals based on a voltage at a connection between the capacitive element and the primary winding.

2. A power supply arrangement comprising a DC/DC converter including:
   - a half bridge, including a first and a second switch element, which when the power supply arrangement is in operation is connected between a first and a second DC voltage potential;

a transformer having a primary side with a primary winding and a secondary side with a secondary winding, whose primary winding together with a first capacitive element is included in a circuit branch connected in parallel to the first switch element, the capacitive element in the circuit branch being connected in series to the primary winding; and a primary-side control loop configured to control voltage on the primary winding of the transformer by adapting control signals for at least one of the first and second switch elements and configured to adapt the control signals based on a voltage at a connection between the capacitive element and the primary winding.

3. A power supply arrangement comprising a DC/DC converter including:

a half bridge, including a first and a second switch element, which when the power supply arrangement is in operation is connected between a supply potential and a reference potential;

a transformer having a primary side with primary winding and a secondary side with secondary winding, whose primary winding together with a capacitive element is included in a circuit branch connected in parallel to the first switch element, the capacitive element in the circuit branch being connected in series to the primary winding and in which a terminal of the capacitive element is connected to the supply potential and a terminal of the second switch element is connected to the reference potential and in which a winding direction of the primary and secondary winding of the transformer is selected so that the energy flow from the primary side to the secondary side of the transformer takes place when a current flows through the second switch element; and a primary-side control loop configured to control a voltage on the primary winding of the transformer by adapting control signals for at least one of the first and second switch elements, configured to adapt a duty cycle associated with the first and second switch elements, and configured to adapt the control signals based on a voltage at a connection between the capacitive element and the primary winding.

4. A power supply arrangement comprising a DC/DC converter including:

a half bridge, including a first and a second switch element, which when the power supply arrangement is in operation is connected between a supply potential and a reference potential;

a transformer having a primary side with primary winding and a secondary side with secondary winding, whose primary winding together with a capacitive element is included in a circuit branch connected in parallel to the first switch element, the capacitive element in the circuit branch being connected in series to the primary winding and in which a terminal of the capacitive element is connected to the supply potential and a terminal of the second switch element is connected to the reference potential and in which a winding direction of the primary and secondary winding of the transformer is selected so that the energy flow from the primary side to the secondary side of the transformer takes place when a current flows through the second switch element; and primary side control loop configured to control a voltage on the primary winding of the transformer by adapting control signals for at least one of the first and second switch elements and configured to adapt the control signals based on a voltage at a connection between the capacitive element and the primary winding.

5. A DC/DC converter comprising:

a half bridge, including a first and a second switch element, which when the power supply arrangement is in operation is connected between a supply potential and a reference potential;

a transformer having a primary side with primary winding and a secondary side with secondary winding, whose primary winding together with a capacitive element is included in a circuit branch connected in parallel to the first switch element, the capacitive element in the circuit branch being connected in series to the primary winding and in which a terminal of the capacitive element is connected to the supply potential and a terminal of the second switch element is connected to the reference potential and in which a winding direction of the primary and secondary windings of the transformer is selected so that an energy flow from the primary side to the secondary side of the transformer takes place, in essence, when a current flows through the second switch element; and a primary side control loop configured to control a voltage on the primary winding of the transformer by adapting control signals for at least one of the first and second switch elements, configured to adapt a duty cycle associated with the first and second switch elements, and configured to adapt the control signals based on a voltage at a connection between the capacitive element and the primary winding.

6. A DC/DC converter comprising:

a half bridge, including a first and a second switch element, which when the power supply arrangement is in operation is connected between a supply potential and a reference potential;

a transformer having a primary side with primary winding and a secondary side with secondary winding, whose primary winding together with a capacitive element is included in a circuit branch connected in parallel to the first switch element, the capacitive element in the circuit branch being connected in series to the primary winding and in which a terminal of the capacitive element is connected to the supply potential and a terminal of the second switch element is connected to the reference potential and in which a winding direction of the primary and secondary windings of the transformer is selected so that an energy flow from the primary side to the secondary side of the transformer takes place, in essence when a current flows through the second switch element; and a primary side control loop configured to control a voltage on the primary winding of the transformer by adapting control signals for at least one of the first and second switch elements and configured to adapt the control signals based on a voltage at a connection between the capacitive element and the primary winding.

* * * * *